US009708033B2

United States Patent
Bonnemaison

(10) Patent No.: US 9,708,033 B2
(45) Date of Patent: Jul. 18, 2017

(54) SHOCK-ABSORBING ASSEMBLY FOR AN APPARATUS AT LEAST PARTIALLY SUBMERGED IN A BODY OF WATER, AND RELATED APPARATUS AND METHOD

(71) Applicant: TECHNIP FRANCE, Courbevoie (FR)

(72) Inventor: Didier Bonnemaison, Collegien (FR)

(73) Assignee: TECHNIP FRANCE (FR)

( * ) Notice: Subject to any disclaimer, the term of this patent is extended or adjusted under 35 U.S.C. 154(b) by 0 days.

(21) Appl. No.: 14/436,008

(22) PCT Filed: Oct. 14, 2013

(86) PCT No.: PCT/EP2013/071437
§ 371 (c)(1),
(2) Date: Apr. 15, 2015

(87) PCT Pub. No.: WO2014/060363
PCT Pub. Date: Apr. 24, 2014

(65) Prior Publication Data
US 2015/0298769 A1 Oct. 22, 2015

(30) Foreign Application Priority Data
Oct. 16, 2012 (FR) .................................. 12 59866

(51) Int. Cl.
*B63B 17/00* (2006.01)
*F16F 9/06* (2006.01)
(Continued)

(52) U.S. Cl.
CPC .......... *B63B 17/0081* (2013.01); *B63B 9/065* (2013.01); *E01D 19/04* (2013.01);
(Continued)

(58) Field of Classification Search
CPC ........ E02B 17/021; E02B 17/04; F16F 9/061; F16F 9/082; F16F 9/22; F16F 9/28;
(Continued)

(56) References Cited

U.S. PATENT DOCUMENTS

| 4,482,272 A | 11/1984 | Colin | |
|---|---|---|---|
| 4,762,442 A * | 8/1988 | Thomas | E02B 17/021 405/196 |
| 4,930,938 A * | 6/1990 | Rawstron | E02B 17/024 405/203 |

FOREIGN PATENT DOCUMENTS

| EP | 0 228 955 A1 | 7/1987 |
|---|---|---|
| EP | 0 654 564 A1 | 5/1995 |

(Continued)

OTHER PUBLICATIONS

International Search Report dated Jan. 13, 2014 issued in corresponding International patent application No. PCT/EP2013/071437.

*Primary Examiner* — Thomas J Williams
(74) *Attorney, Agent, or Firm* — Ostrolenk Faber LLP

(57) ABSTRACT

The assembly includes a one group (40A to 40C) of hydraulic shock absorbers (42), each shock absorber (42) comprising a hydraulic jack comprising a cylinder designed to be supported by the first element (14), and a shock-absorbing member partially received in the cylinder. The shock-absorbing member has a head protruding outside the cylinder, the head being designed to come into contact with the second element during mounting of the second element on the first element (14).
The shock-absorbing assembly (17) includes, for each group (40A to 40C) of shock absorbers (42), a fluid accumulator (44) connected to each cylinder of the group of shock absorbers (42), to allow a hydraulic fluid transfer between the different cylinders of the group of shock absorbers (42) during contact between each head and the second element.

18 Claims, 7 Drawing Sheets

(51) Int. Cl.
   *F16F 9/22*      (2006.01)
   *B63B 9/06*      (2006.01)
   *F16F 15/023*    (2006.01)
   *E01D 19/04*     (2006.01)
   *E04H 9/02*      (2006.01)
   *E02B 17/00*     (2006.01)
   *F16F 9/56*      (2006.01)

(52) U.S. Cl.
   CPC ......... *E02B 17/0017* (2013.01); *E04H 9/021* (2013.01); *F16F 9/061* (2013.01); *F16F 9/22* (2013.01); *F16F 9/56* (2013.01); *F16F 15/023* (2013.01); *B63B 2009/067* (2013.01); *E02B 2017/0073* (2013.01)

(58) Field of Classification Search
   CPC ........ F16F 9/56; F16F 15/023; F16F 15/0232; B63B 17/0081; B63B 9/065
   USPC .......................... 405/196, 198, 201, 221, 224
   See application file for complete search history.

(56) References Cited

FOREIGN PATENT DOCUMENTS

| | | | | |
|---|---|---|---|---|
| FR | 2 516 112 A1 | | 5/1983 | |
| GB | 1367688 A | * | 9/1974 | ................ F15B 1/02 |
| GB | 2165188 B | * | 10/1988 | ........... B63B 35/003 |
| NL | 8 701 804 | | 2/1989 | |

* cited by examiner

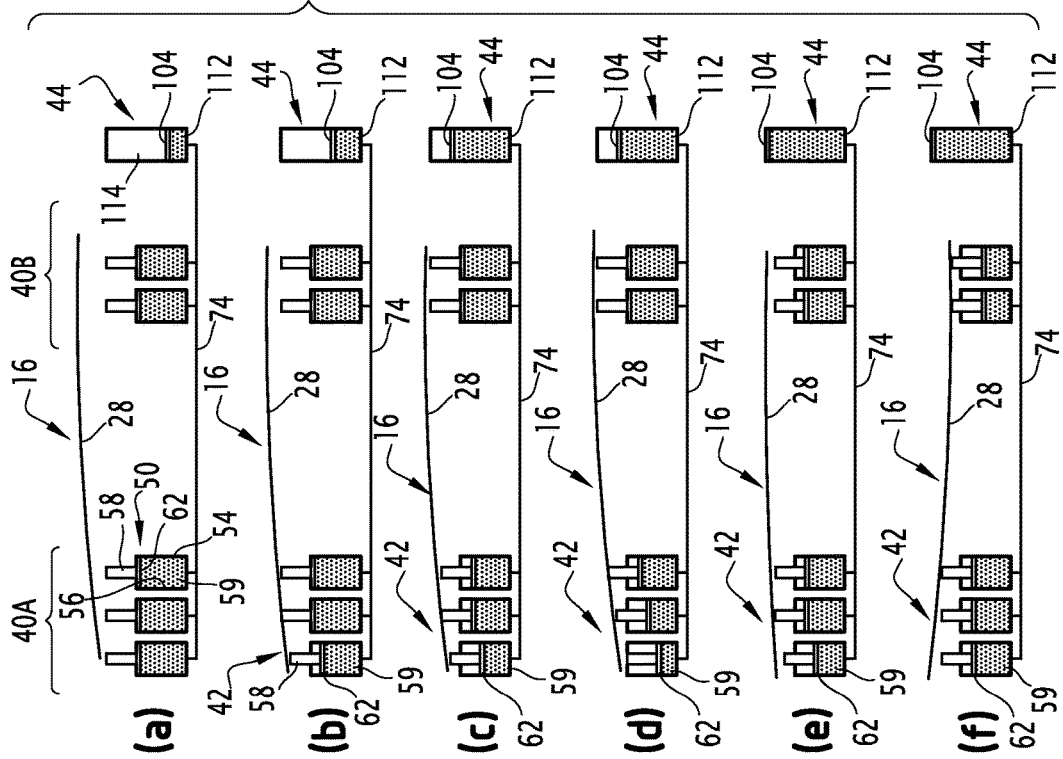
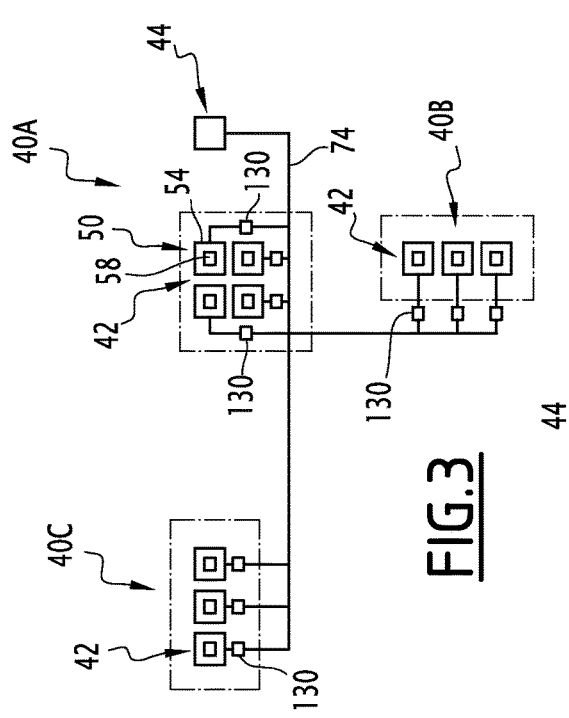
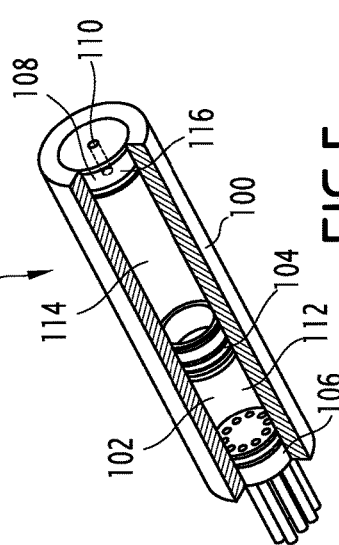
FIG.4
FIG.3
FIG.5

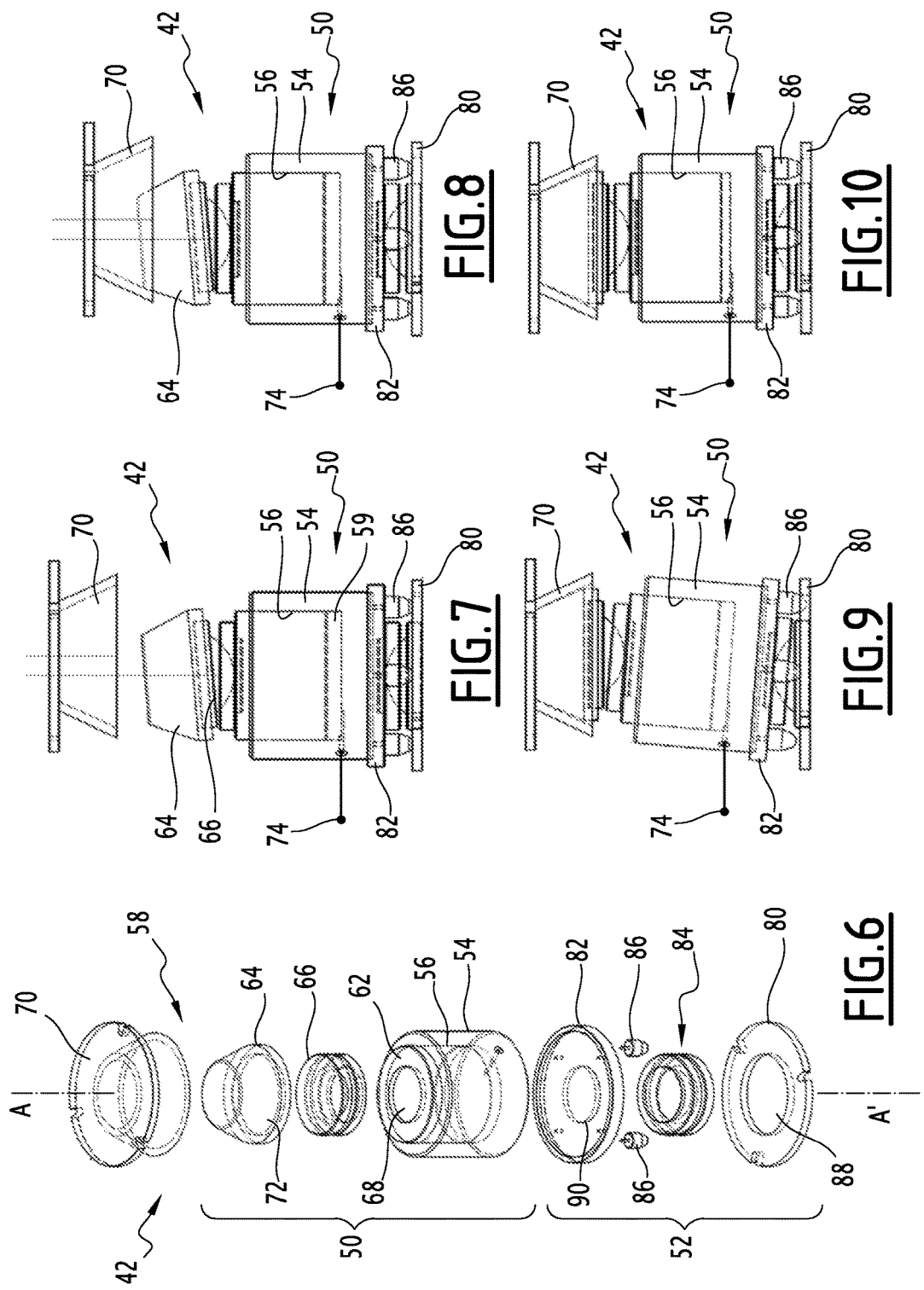

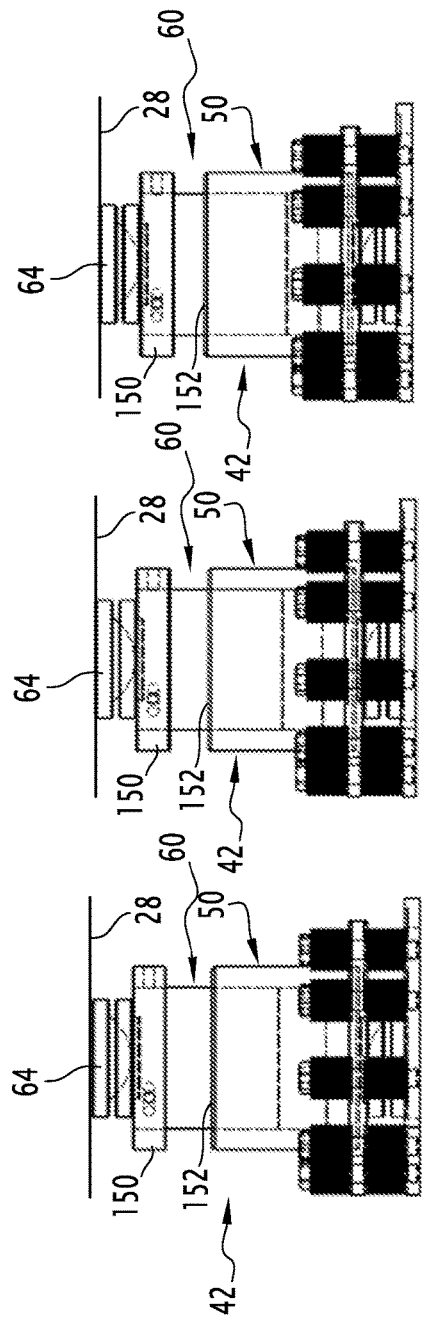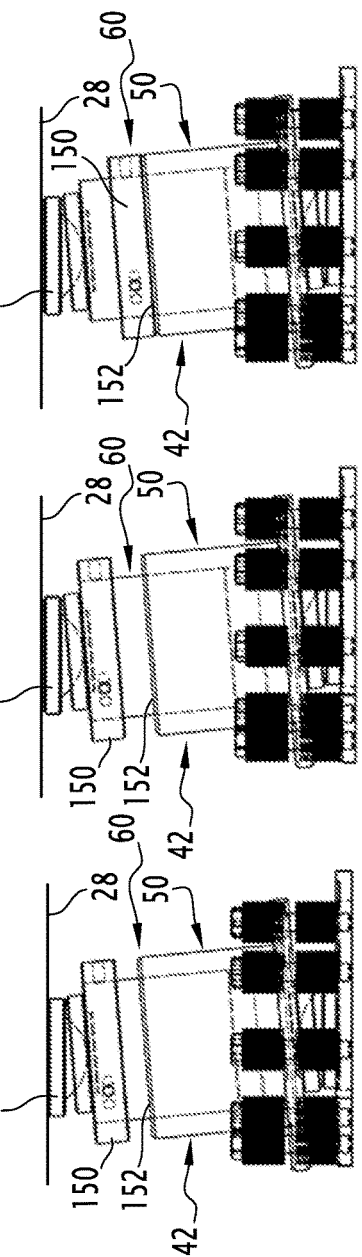

SHOCK-ABSORBING ASSEMBLY FOR AN APPARATUS AT LEAST PARTIALLY SUBMERGED IN A BODY OF WATER, AND RELATED APPARATUS AND METHOD

CROSS-REFERENCE TO RELATED APPLICATIONS

The present application is a 35 U.S.C. §371 National Phase conversion of PCT/EP2013/071437, filed Oct. 14, 2013, which claims benefit of French Application No. 1259866, filed Oct. 16, 2012, the disclosure of which is incorporated herein by reference. The PCT International Application was published in the French language.

TECHNICAL FIELD OF THE INVENTION

The present invention relates to a shock-absorbing assembly able to be interposed between a first element and a second element of an installation at least partially submerged in a body of water, comprising:
  at least one group of hydraulic shock absorbers, each shock absorber comprising a hydraulic jack comprising a cylinder designed to be supported by the first element, and a shock-absorbing member partially received in the cylinder, the shock-absorbing member having a head protruding outside the cylinder, that head being designed to come into contact with the second element during mounting of the second element on the first element.

The installation is for example designed for the exploitation of hydrocarbons present at the bottom of a body of water, such as a sea, ocean or lake.

The installation is advantageously an oil exploitation platform fixed on the bottom of the body of water or floating in the body of water.

This installation comprises a first element formed by a lower hull partially submerged in the body of water and a second element formed by a deck fastened on the hull and supporting all of the elements necessary for the exploitation of the fluid and/or housing the staff operating the installation.

In order to simplify the manufacture and placement of such an installation, it is known to manufacture the hull and the deck separately on a worksite. The hull is then transported to the operation site at sea, where it is immobilized.

The deck is placed on a barge that can be ballasted. To avoid using large-capacity cranes, it is known to provide a hull comprising support piles for the deck delimiting an intermediate space between them that can receive the barge.

The weakly ballasted barge is then brought into the intermediate space to place the deck above and across from the legs.

Then, ballast is introduced into the barge to cause it to descend until the deck comes into contact with the legs and becomes wedged on the hull. The barge is then removed and the deck is permanently fastened on the hull.

Such a placement method can be carried out when the body of water is not highly agitated. Indeed, the agitation of the body of water due to the swell, current and wind locally alters the position of the deck relative to each leg. This can cause damage to the deck and/or the leg if the contact between the deck and the leg is made too violently.

In order to limit this problem, it is known to mount, on the upper surface of each leg, a group of shock-absorbing elements made from an elastic material that are interposed between the deck and the leg to limit the impact between those elements.

Those shock-absorbing elements are not fully satisfactory, since they next remain permanently jammed between each leg and the deck, once the assembly is finalized between each leg [and] the deck. It is sometimes necessary to burn these elements to be rid of them.

FR 2,516,112 describes a shock-absorbing assembly interposed between a barge and a deck. The shock-absorbing assembly comprises a plurality of hydraulic jacks mounted on the barge. The deployment of the jack rods is driven by a controller that is connected to sensors determining the intensity of the swell at different points.

Such an assembly is therefore particularly complicated to adjust, and its practical implementation in agitated environments may be very tedious.

SUMMARY OF THE INVENTION

One aim of the invention is therefore to provide a shock-absorbing assembly designed to be interposed between a first element and a second element of an installation at sea during mounting of the installation, which limits the risk of collision and/or damage between the first element and the second element and is easy to implement.

To that end, the invention relates to an assembly of the aforementioned type, characterized in that the shock-absorbing assembly comprises, for each group of shock absorbers, a fluid accumulator connected to each cylinder of the group of shock absorbers, to allow a hydraulic fluid transfer between the different cylinders of the group of shock absorbers during contact between each head and the second element.

The assembly according to the invention may include one or more of the following features, considered alone or according to any technically possible combination(s):
  the fluid accumulator comprises a hollow body delimiting an equilibration chamber and an equilibration piston mounted movably in the equilibration chamber, between a plurality of intermediate positions, wherein the equilibration piston is free to move relative to the hollow body in two opposite directions, and a downstream abutting position, in which the equilibration piston is immobilized in at least one direction relative to the hollow body;
  in each intermediate position, the equilibration piston sealingly delimits, in the equilibration chamber, an upstream region designed to receive the hydraulic fluid coming from each hydraulic cylinder, and a downstream region designed to contain a volume of gas able to be expelled outside the equilibration chamber, advantageously by a valve emerging outside the equilibration chamber in a constant-pressure gas volume;
  each shock-absorbing member comprises a shock-absorbing piston received in the cylinder, the head being pivotably mounted along at least one axis relative to the shock-absorbing piston, the head advantageously being connected to the shock-absorbing piston by a ball joint;
  each shock absorber comprises a base designed to be fastened on the first element, the cylinder of the hydraulic jack being mounted pivoting around at least one axis relative to the base, between a straight rest configuration and a plurality of inclined configurations relative to the rest configuration;
  each shock absorber comprises at least one return member for returning the cylinder to its rest configuration;

each shock absorber comprises a mechanical locking mechanism, able to mechanically immobilize the shock-absorbing member relative to the cylinder; and it comprises at least two groups of hydraulic shock absorbers, advantageously at least three groups of hydraulic shock absorbers, designed to be spaced apart from one another on the first element, the hydraulic shock absorbers of each group each being connected to a same fluid accumulator, advantageously shared between all of hydraulic shock absorbers of all of the hydraulic shock-absorbing groups.

The invention also relates to an installation designed to be at least partially submerged in a body of water, characterized in that it comprises:

a first element;
a second element assembled on the first element;
a shock-absorbing assembly as defined above, interposed between the first element and the second element, each cylinder of each shock absorber being supported by the first element, the head of at least some of the shock absorbers being in contact with the second element.

The installation according to the invention may include one or more of the following features, considered alone or according to any technically possible combination(s):

the second element is laid on the first element;
the first element is a support floating on a body of water or fastened on the bottom of the body of water, the second element being a deck placed above the surface of the body of water;
the first element comprises a hull comprising an openwork base defining ballast boxes and piles protruding relative to the openwork base, the piles each delimiting a receiving surface, the installation comprising, for each pile, a shock-absorbing assembly as defined above, fluidly independent from the other shock-absorbing assemblies, the shock-absorbing assembly being interposed between the receiving surface of said pile and the second element;
each shock-absorbing assembly is able to be disassembled, relative to the first element and/or the second element, preferably at least after the placement of a definitive fastening assembly between the second element and the first element.

The invention also relates to a method for mounting an installation at least partially submerged in a body of water, comprising the following steps:

providing a first element, and a shock-absorbing assembly as defined above, the cylinder of each shock absorber being supported by the first element, the head of each shock-absorbing member protruding outside the cylinder;
placing the second element in contact with the heads of several shock absorbers of the group of shock absorbers;
free circulation of hydraulic fluid between the cylinders of the group of shock absorbers and the accumulator.

The method according to the invention may include one or more of the following features, considered alone or according to any technically possible combination(s):

the fluid accumulator comprises a hollow body delimiting an equilibration chamber and an equilibration piston mounted movably in the equilibration chamber, the free circulation of hydraulic fluid comprising a first phase in which the equilibration piston moves freely in the equilibration chamber under the effect of the hydraulic fluid coming from the cylinders of the shock absorbers, and a second phase in which the equilibration piston is immobilized in the equilibration chamber, and in which the hydraulic fluid present in the equilibration chamber and the cylinders is freely distributed between the equilibration chamber and the cylinders;

each shock-absorbing member comprises a shock-absorbing piston received in the cylinder, the head being pivotably mounted along at least one axis relative to the shock-absorbing piston, the method comprising, after placing the second element in contact on the head of at least one shock-absorbing member, pivoting of the head relative to the shock-absorbing piston;

each shock absorber comprises a base designed to be fastened on the first element, the cylinder of the hydraulic jack being mounted pivoting around at least one axis relative to the base, the method comprising, after placing the second element in contact on the head of at least one shock-absorbing member, pivoting of the cylinder relative to the base between a straight rest configuration and an inclined configuration relative to the rest configuration.

BRIEF DESCRIPTION OF THE DRAWINGS

The invention will be better understood upon reading the following description, provided solely as an example and done in reference to the appended drawings, in which:

FIG. 3 is a diagrammatic top view of the shock-absorbing assembly according to the invention;

FIG. 4 is a side view illustrating different usage phases of the shock-absorbing assembly according to the invention during placement of a second element on the first element;

FIG. 5 is a perspective and partial sectional view of the fluid accumulator of the shock-absorbing assembly according to the invention;

FIG. 6 is an exploded perspective view of a first example shock absorber for a shock-absorbing assembly according to the invention;

FIGS. 7 to 10 are side views illustrating different usage phases of the shock absorber of FIG. 6, during the placement of the second element on the first element;

FIGS. 13 to 18 are side views illustrating different usage phases of the shock absorber of FIG. 11 during the placement of the second element on the first element;

DESCRIPTION OF EMBODIMENTS

Figure 1:
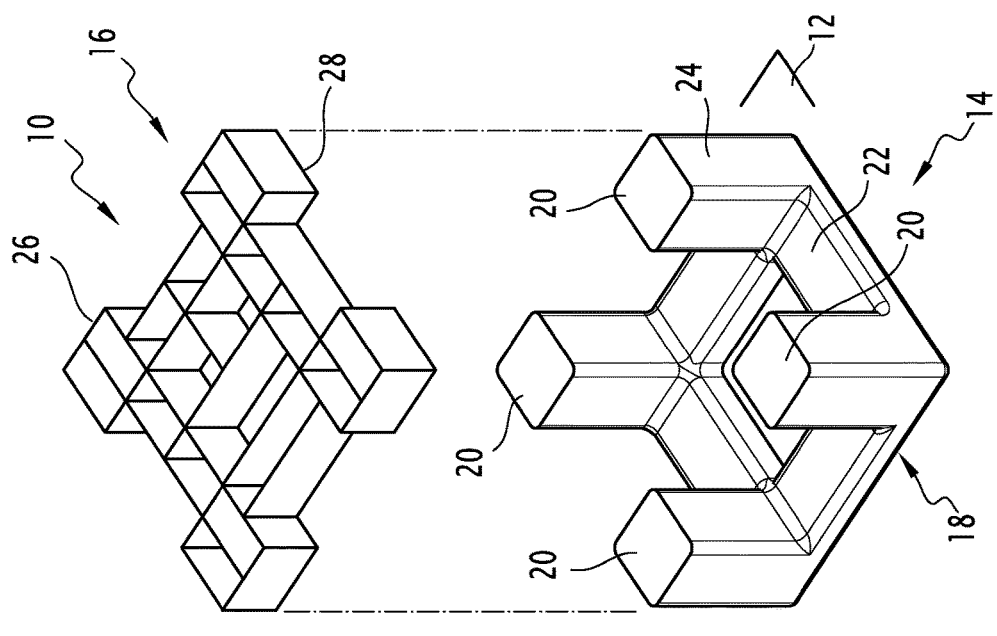
FIG. 1 is an exploded perspective diagrammatic view of a first fluid exploitation installation according to the invention.

A first installation 10 according to the invention, at least partially submerged in a body of water 12, is diagrammatically illustrated by FIG. 1.

The installation 10 is advantageously intended for fluid exploitation through the body of water 12, in particular to collect fluid withdrawn from the bottom of the body of water 12 and bring it to the surface.

The withdrawn fluid preferably contains a hydrocarbon. It is for example formed by natural gas or oil.

The body of water 12 is a sea, ocean or lake. The depth of the body of water 12, at the installation 10, is for example greater than 20 m, and in particular comprised between 20 m and at least 3000 m.

The installation 10 is advantageously a platform fastened on the bottom of the body of water 12 or preferably floating on the body of water 12. This platform is in particular of the semisubmersible, SPAR or Tension Leg Platform (TLP) type. Alternatively, the installation is a fixed platform such as a "jack up platform".

The installation 10 comprises a first element 14 partially submerged in the body of water 12 and a second element 16, positioned above the surface of the body of water 12, bearing on the first element 14.

The installation 10 further comprises a shock-absorbing assembly 17 according to the invention, interposed between the first element 14 and the second element 16, at least during the mounting of the second element 16 on the first element 14, and a fastening assembly (not shown) for definitive fastening of the second element 16 on the first element 14.

The first element 14 is fastened to the bottom of the body of water 12 or floats above the bottom of the body of water 12.

It comprises a hull 18 that is partially submerged, having at least one upper surface 20 for receiving the second element 16, and ballast boxes (not shown).

The upper surface 20 is positioned above the surface of the body of water 12.

In the example shown in FIG. 1, the hull 18 comprises an openwork base 22 defining ballast boxes and piles 24 protruding relative to the openwork base 22. The piles 24 each delimit a receiving surface 20.

The second element 16 is placed on the first element 14 and is fastened to the element 14 using the definitive fastening assembly (not shown). In this example, the second element comprises a deck 26 positioned above the surface of the body of water 12.

The deck 26 supports equipment and/or utilities necessary for exploitation of the fluid recovered on the platform such as wellheads, fluid collectors, separators, treatment units, etc. It advantageously comprises equipment necessary for housing and transportation for personnel operating the installation 10.

In reference to FIG. 1, the second element 16 delimits a lower surface 28 bearing on the first element 14.

The fastening assembly (not shown) comprises a plurality of mechanical links welded between the first element 14 and the second element 16, such as plates connecting the first element 14 to the second element 16.

The fastening assembly is placed after the second element 16 has been placed in contact with shock-absorbing assembly 17.

Figure 2:
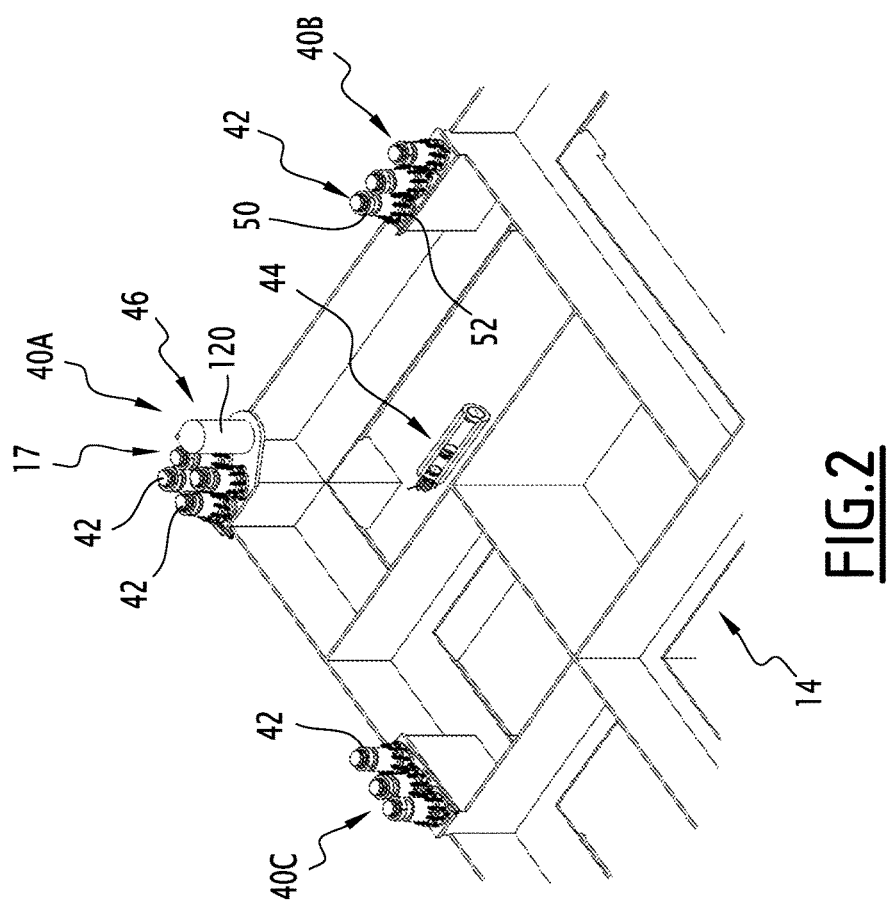
FIG. 2 is a three-quarters front perspective view of a detail of the first element of the installation of FIG. 1, on which a shock-absorbing assembly according to the invention is mounted.

In reference to FIG. 2, the shock-absorbing assembly 17 comprises at least one group 40A to 40C of shock absorbers 42, supported by the first element 14, and at least one fluid accumulator 44 shared by the shock absorbers 42 of a group 40A to 40C.

In this example, the shock-absorbing assembly 17 further advantageously comprises at least one indexing member 46 for indexing the position of the second element 16 relative to the first element 14 when the second element 16 comes into contact with the shock-absorbing assembly 17.

In the example shown in the figures, the shock-absorbing assembly 17 comprises at least two groups, advantageously three groups 40A to 40C, of shock absorbers 42 distributed on each upper surface 20.

The groups 40A to 40C are advantageously positioned near the periphery of the upper surface 20. They are spaced apart from one another.

Each group 40A to 40C comprises a plurality of shock absorbers 42 connected to a shared fluid accumulator 44 between the shock absorbers 42.

In reference to FIGS. 2, 4 and 6, each shock absorber 42 comprises a hydraulic jack 50 and an assembly 52 for mounting the hydraulic jack 50 on the first element 14, able to allow at least one degree of rotational freedom between the first element 14 and the hydraulic jack 50.

As illustrated by FIG. 6, the hydraulic jack 50 comprises a cylinder 54 defining a chamber 56 and a shock-absorbing member 58. The member 58 is mounted movably in the chamber 56 of the cylinder 54 between a retracted position and a deployed position partially protruding outside the cylinder 54.

The jack 50 further advantageously comprises a releasable mechanism 60 for mechanically locking the position of the shock-absorbing member 58 relative to the cylinder 54. This mechanism is visible in FIGS. 11 to 20 and applies to the shock-absorbing assembly 17 of FIG. 6.

The cylinder 54 is supported by the mounting assembly 52. It extends substantially perpendicularly or on an incline relative to the receiving surface 20, above the latter.

It contains a hydraulic fluid for actuating the shock-absorbing member 58 received in an inner region 59 of the chamber 56 situated below the shock-absorbing member 58.

The actuating fluid is substantially incompressible. It is for example formed by a liquid, such as hydraulic oil.

In reference to FIG. 6, the shock-absorbing member 58 comprises a piston 62 mounted sliding in the chamber 56 along an axis A-A' of the cylinder 54 between the retracted position of the member 58 and the deployed position of the member 58. The shock-absorbing member 58 further comprises a head 64 protruding outside the cylinder 54 to come into contact with the second element 16.

Advantageously, the shock-absorbing member 58 also comprises an intermediate member 66 for articulating the head 64 relative to the piston 62, able to allow at least one degree of rotational freedom between the head 64 and the piston 62 along an axis perpendicular to the axis A-A'.

The piston 62 tightly closes off the inner region 59 containing the actuating fluid.

In this example, it delimits an upper basin 68 in which the intermediate member 66 is inserted.

The head 64 is intended to come into contact with the second element 16, advantageously by means of a guide member 70 fastened below the bearing surface 28 of the second element 16.

The head 64 defines the free end of the shock absorber 62. In this example, the head 64 has a convergent shape, for example frustoconical, along the axis A-A' while moving away from the cylinder 54. The guide member 70 has a complementary shape.

The head 64 here delimits a lower basin 72 for housing the intermediate member 66.

The intermediate member 66 is intercalated between the head 64 and the piston 62. In this example, it is received in each of the basins 68, 72. Here it is formed by a ball joint connection.

Thus, the head 64 is able to pivot relative to the piston 68 around a plurality of axes perpendicular to the axis A-A' of the cylinder 54, between an aligned configuration, along the axis A-A' (see FIG. 10), and a plurality of inclined configurations relative to the axis A-A' (see FIG. 7 to FIG. 9).

This limits the stresses applied on the shock-absorbing member 58, in particular as a function of the relative incline between the receiving surface 20 and the bearing surface 28, and the stresses due to the misalignment after the contact between the head 64 and the guide member 70.

The jack 50 of each shock absorber 42 is hydraulically connected to an accumulator 44 shared by several shock absorbers 42 of a group 40A to 40C. To that end, the inner region 59 of the chamber 56 defined in the cylinder 54 is hydraulically connected to the accumulator 44 by a hydraulic circuit 74 shown in FIGS. 3 and 4.

In reference to FIG. 6, the mounting assembly 52 comprises a base 80 fastened on the receiving surface 20, a jack support 82 mounted movably relative to the base 80, and an articulation member 84 for articulating the jack support 82 relative to the base 80, interposed between the support 82 and the base 80.

The mounting assembly 52 thus allows the jack 50 to go between a straight rest configuration, substantially perpendicular to the surface 20, shown in FIG. 10, and a plurality of inclined configurations, one of which is shown in FIG. 9.

It further comprises at least one member 86 for returning the jack through its straight configuration, positioned between the support 82 and the base 80.

The base 80 is formed by a plate fastened on the receiving surface 20. It defines an upper housing 88 for receiving the articulation member 84.

In this example, the support 82 comprises a plate supporting the cylinder 54. It is movable jointly with the cylinder 54 of the jack 50. The support 82 defines a lower housing 90 for receiving the articulation member 84.

The articulation member 84 is formed by a ball joint placed on the base 80 in the housing 88 and received in the lower housing 90.

Each return member 86 is inserted in the interstice between the jack support 82 and the base 80. In this example, each return member 86 is formed by a block of elastic material, such as an elastomer block.

In this example, the return member 86 is attached below the jack support 82. Alternatively, the return member 86 is fastened on the base 80.

In each inclined configuration of the jack 50, at least one return member 86 is able to be compressed between the jack support 82 and the base 80 to create an elastic force biasing the jack 50 toward its rest configuration.

The presence of at least one degree of rotational freedom between the jack 50 and the upper surface 20 also limits the stresses applied on the shock absorber 42, in particular based on the relative incline between the upper receiving surface 20 and the lower bearing surface 28, and the stresses due to the misalignment after contact of the head 64 with the guide member 70.

The locking mechanism 60 comprises a locking stop 150 (shown in the embodiment of FIG. 12) mounted around the piston 62 of the shock-absorbing member 58 outside the cylinder 54. This stop 150 is advantageously screwed on a thread present outside the piston 62. Alternatively (not shown), a reversible fastening member is inserted through the locking stop 150 to secure the locking stop 150 to the piston 62.

In this example, the locking stop 150 is of revolution around the axis of the piston 62. It is able to cooperate with an upper surface 152 of the cylinder 54 to prevent the shock-absorbing member 58 from moving toward its retracted position.

As specified above, the accumulator 44 is connected to each shock absorber 42 of a group of shock absorbers 40A to 40C by the hydraulic circuit 74.

Advantageously, the shock-absorbing assembly 17 according to the invention comprises a single accumulator 44 shared by all of the shock absorbers 42 of all of the groups of shock absorbers 40A to 40C.

The accumulator 44 is supported by the first element 14. In reference to FIG. 5, it comprises a hollow body 100 defining an equilibration chamber 102, an equilibration piston 104 mounted movably in the chamber 102, and an upstream nozzle 106 for injecting hydraulic fluid into the chamber 102.

In the embodiment of FIG. 5, the accumulator further comprises a downstream sealing member 108 advantageously defining a gas exhaust valve 110.

The upstream nozzle 106 is hydraulically connected to the circuit 74 to allow the two-way circulation of hydraulic fluid between each jack 50 connected to the accumulator 44 and the chamber 102 of the accumulator 44.

The piston 104 is freely movable in the chamber 102 between a plurality of intermediate positions, one of which is shown in FIG. 5, and a downstream stop position shown in FIG. 4, in step (d).

In each intermediate position, the piston 104 delimits an upstream region 112 in the chamber situated between the fluid injection nozzle 106 and the piston 104, and a downstream region 114 situated between the piston 104 and the downstream sealing member 108.

The upstream region 112 contains the hydraulic fluid coming from each jack 50 connected to the accumulator 44. The downstream region 114 contains a gas able to be discharged outside that region 114 through the exhaust valve 110 connected to a constant-pressure gas network, for example a chamber with a volume larger than the volume of each jack 50.

The piston 104 is free to move toward the downstream position.

In the downstream stop position, the piston 104 is immobilized in the chamber 102, advantageously bearing against the downstream closing member 108. The upstream region 112 has a maximum volume. The downstream region 114 has a minimal or null volume.

The exhaust valve 110 is formed by a calibrated passage 116 arranged through the downstream closing member 108. The passage 116 emerges upstream in the downstream region 114 and downstream outside the accumulator 44.

As will be seen below, each shock-absorbing member 58 is able to be moved by the second element 16 from its deployed position toward its retracted position, to retract into the cylinder 54 and thereby decrease the volume of the inner region 59. This causes hydraulic fluid to be discharged toward the circuit 74 and filling of the downstream region 112.

The filling of the upstream region 112 in turn causes the movement of the equilibration piston 104 to increase the volume in the upstream region 112, until the piston 104 reaches its downstream stop position.

As will be seen below, hydraulic fluid is then distributed between the upstream region 112, the circuit 74, and each inner region 59 of the cylinder 54.

In this example, the indexing member 46 is formed by a stud 120 (shown in FIG. 2) mounted substantially parallel to each shock absorber 42. The stud 120 is designed to be received in a corresponding housing (not shown) on the second element 16.

The operation of the shock-absorbing assembly 17 according to the invention, during the mounting of the first installation 10, will now be described.

Initially, the first element 14 and the second element 16 are manufactured separately.

The first element 14 is partially submerged in the body of water 12 and is conveyed to the assembly point of the installation 10.

The first element 14 is then partially ballasted to go down each receiving surface 20.

As illustrated in step (a) of FIG. 4, the shock-absorbing members 58 of each shock absorber 42 then occupy their deployed position. The volume of each inner region 59 situated below the shock-absorbing member 58 in the chamber 54 of each jack 50 is then maximal.

The equilibration system 104 is in an intermediate position close to the nozzle 106. The volume of the upstream region 112 is then minimal. The downstream region 114 is filled with gas and its volume is maximal.

The second element 16 is next conveyed over the body of water 12 to the assembly point, for example on a barge. It is placed above and separated from the first element 14.

Each lower bearing surface 28 of the second element 16 is then placed across from an upper receiving surface 20 of the first element 14.

Then, the second element 16 is moved vertically relative to the first element 14 to bring it closer to the first element 14.

As illustrated by step (b) of FIG. 4, the bearing surface 28 defined by the second element 16 may be non-parallel to the receiving surface 26 bearing the shock absorbers 42, or nonplanar due to the deformation caused by its own weight. A stress may in particular remain at the ends.

The bearing surface 28 then comes into contact with at least one head 64 of a shock-absorbing member 58. The bearing surface 28 then pushes the head 64 into downward contact.

This causes the shock-absorbing member 58 to move toward a position retracted in the cylinder 54. The piston 62 then moves downward in the cylinder 54, causing a decrease in the volume of the inner region 59.

During that contact, the head 64 is able to pivot relative to the piston 62 to correct any alignment effects between the guide member 70 and the support 80, while minimizing the shear and pulling out stresses, since the entire jack 50 can pivot.

Over the course of the lowering of the surface 28, one or more shock-absorbing members 58 of each group 40A to 40C of shock absorbers 42 come into contact with the surface 28 and are pushed downward. Conversely, some of the shock-absorbing members 58 may remain in the deployed position (see steps (c) to (d) of FIG. 4).

The decrease in the volume of the inner region 59 of certain shock absorbers 42 causes the expulsion of hydraulic fluid outside their jack 50 and the gradual filling of the upstream region 112 of the accumulator 44.

The equilibration piston 104 then moves toward the downstream closing member 108 while expelling a calibrated quantity of gas outside the downstream region 114 via the valve 110 connected to the constant-pressure gas network.

During that phase, the pressure of the hydraulic fluid in the upstream region 112 remains moderate, for example less than 20 bars.

Then, the equilibration piston 104 reaches its downstream stop position, shown in step (e) of FIG. 4. The pressure of the hydraulic fluid in the upstream region 112 then increases significantly, to reach an intermediate working pressure for example greater than 100 bars, advantageously greater than 300 or 400 bars, in particular approximately 700 bars. This hydraulic pressure creates a reaction force on the shock-absorbing members 58 via the circuit 74.

The transfer of the weight of the second element 16 onto the first element 14 then begins, with the pressure increase in the system. During that transfer, the curvature of the second element 16 and the bearing surface 28 changes.

The equilibration piston 104 of the accumulator 44 is then motionless. The shock-absorbing members 58 of the shock absorbers 42 connected to the same accumulator 44 nevertheless remain movable in their respective cylinders 54.

Subsequently, as illustrated by steps (e) and (f) of FIG. 4, a re-equilibration of pressure occurs between the jacks of a same group 40A to 40C, which spontaneously adjusts the position of the various shock-absorbing members 58 as a function of the bearing force of the second element 16 locally applied on the head 64 of each shock-absorbing member 58.

Thus, some of the shock-absorbing members 58 rise in their respective cylinders 54, while some of the shock-absorbing members 58 lower in their respective cylinders 54.

This movement is done spontaneously, without it being necessary to control the pressure in each cylinder 54 individually. The shock-absorbing assembly 17 according to the invention is therefore auto-adjustable, based on the configuration of the bearing surface 28 relative to the receiving surface 20, during the load transfer, and once the load transfer is done.

The load applied by the second element 16 is therefore distributed substantially uniformly between the shock-absorbing members 58, completely autonomously by pressure equilibration.

The structure of the shock-absorbing assembly 17 is therefore simple and does not require performing complicated regulations during the load transfer. Furthermore, no human intervention is a priori necessary during this phase.

Furthermore, as illustrated by FIG. 9, each jack 50 can pivot spontaneously relative to the receiving surface 26, between its straight configuration and an inclined configuration so as to minimize the shear stresses applied on the jack 50 during the equilibration, until the indexing member 46 indexes the position of the second element 16 relative to the first element 14.

This pivoting occurs by compression of at least part of the return members 86 between the jack support 82 and the base 80.

Once equilibrium is achieved, each shock-absorbing member 58 is mechanically immobilized in its cylinder 54 by the mechanical locking mechanism 60.

In particular, the locking stop 150 is screwed downward to bring it into contact with the upper surface 152 and lock the piston.

The definitive fastening assembly (not shown) is then assembled between the first element 14 and the second element 16, for example by welding plates between the receiving surface 20 and the bearing surface 28.

Once this is done, the shock-absorbing assembly 17 is advantageously disassembled, while discharging at least some of the fluid present in each chamber 56, thus causing the retraction of the shock-absorbing member 58.

This disassembly is simple. It makes it possible to decrease the weight present on the installation 10 and reduce the shock-absorbing assembly 17 if necessary.

In an alternative illustrated diagrammatically in FIG. 3, a valve 130 for selective isolation of each shock absorber 42 is interposed on the circuit 74 between each shock absorber 42 and the accumulator 44. In that case, each jack 50 is able to be isolated from the circuit 74 during the assembly of the second element 16 on the first element 14.

In another alternative (not shown), pressure sensors are positioned in each jack 50 to measure the pressure of the hydraulic fluid present in the jack 50 during assembly.

A second example shock absorber 42 for a shock-absorbing assembly 17 according to the invention is illustrated by FIGS. 11 to 18.

Unlike the shock absorber 42 shown in FIG. 6, the return members 86 are able to keep the jack 50 in a substantially vertical configuration during the initial movement phase of the shock-absorbing member 58, after the contact between the head 64 and the bearing surface 28.

Each return member 86 thus comprises a first elastic biasing member 140 situated between the jack support 82 and the base 80, and a second elastic biasing member 142 situated above the jack support 82, between the jack support 82 and a stop 144 secured in translation with the base 80.

Figure 12:
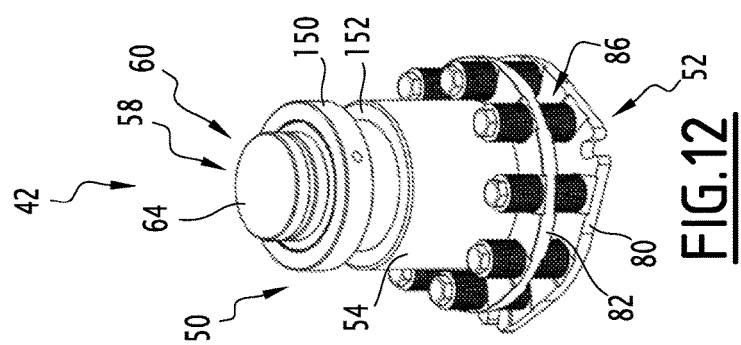
FIG. 12 is a three-quarters front perspective view of the shock absorber of FIG. 11.
Figure 11:
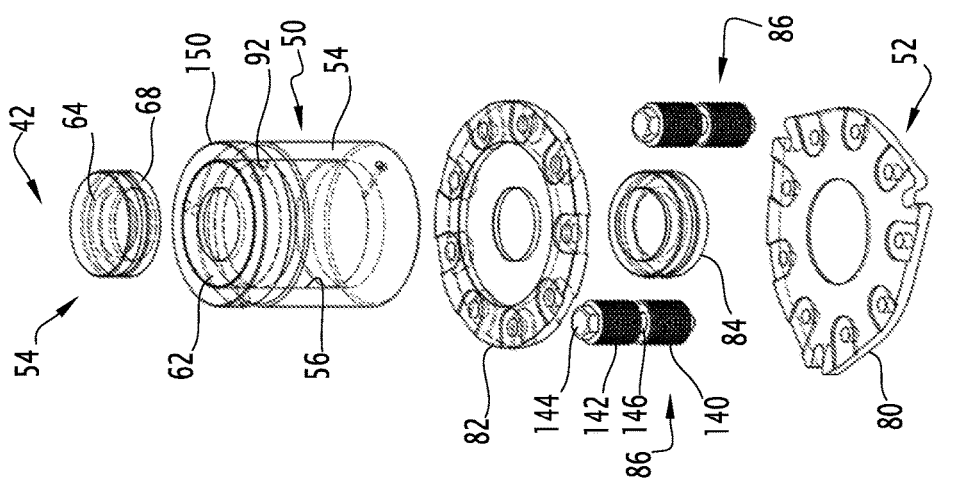
FIG. 11 is a view similar to FIG. 6 of a second example shock absorber for a shock-absorbing assembly according to the invention.

In the example shown in FIGS. 11 and 12, the elastic biasing members 140, 142 are formed by stacks of elastic washers mounted coaxially around a central rod 146.

The central rod 146 is fastened on the base 80. It crosses through the rod support 82 and delimits the stop 144 at its free end.

The first elastic biasing member 140 is situated above the second elastic biasing member 142. Thus, the risk of pulling out of the articulation member 84 is minimized.

Thus, each return member 86 is active irrespective of the local movement of the jack support 82, during the incline of the jack 50. Thus, if the jack support 82 moves locally away from the base 80 at the point of contact with the return member 86, the second elastic biasing member 142 exerts a return force returning the support 82 toward its rest configuration.

On the contrary, if the jack support 82 moves locally toward the base 80 at the point of contact with the return member 86, the first elastic biasing member 140 exerts a return force returning the support 82 to its rest configuration.

During operation, in reference to FIGS. 13 to 15, the jack 50 of each shock-absorbing member 58 retains its straight rest configuration during the contact between the head 64 and the bearing surface 28 of the second element 16.

This configuration is maintained during the initial retraction of the shock-absorbing member 58 in the chamber 56, while the equilibration piston 104 present in the accumulator 44 is free to move in the equilibration chamber 102.

In reference to FIGS. 16 to 18, when the indexing member 46 present on the first element 14 cooperates with the second element 16, the load transfer from the second element 16 onto the first element 14 occurs. At this stage, and as illustrated by FIGS. 16 to 17, the jack 50 adopts an inclined configuration making it possible to limit the shear stresses.

When the equilibration piston 104 reaches its downstream stop position, a pressure re-equilibration occurs between the chambers 56 of the different cylinders 54 and the position of the shock-absorbing members 58 adjusts automatically to adapt to the configuration of the bearing surface 28 (see FIG. 17).

Once the equilibration is done, an operator moves the locking stop 150 downward to bring it into contact with the upper surface 152. This movement is for example done by screwing.

The hydraulic fluid present in the chamber 56 can be at least partially bled to reduce the pressure in the jack 50.

Figure 20:
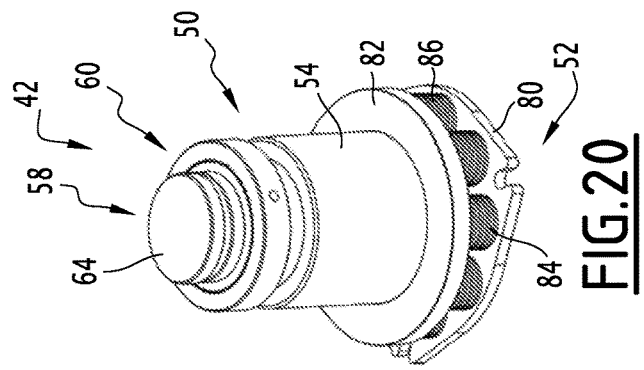
FIG. 20 is a view similar to FIG. 12 for the shock absorber of FIG. 19.
Figure 19:
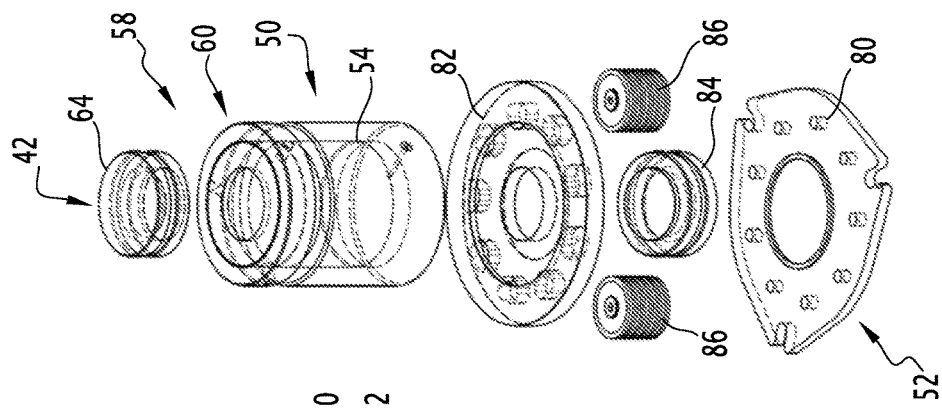
FIG. 19 is a view similar to FIG. 11 of a third example shock absorber for a shock-absorbing assembly according to the invention.

A third example shock absorber 42 for a shock-absorbing assembly 17 according to the invention is illustrated by FIGS. 19 and 20.

Unlike the first shock absorber 42 described in FIG. 6, the return members 86 are formed by Belleville washers stacked between the jack support 82 and the base 80.

The operation of the shock absorber 42 described in FIGS. 19 and 20 is furthermore similar to the operation of the shock absorber 42 described in FIG. 6.

Figure 22:
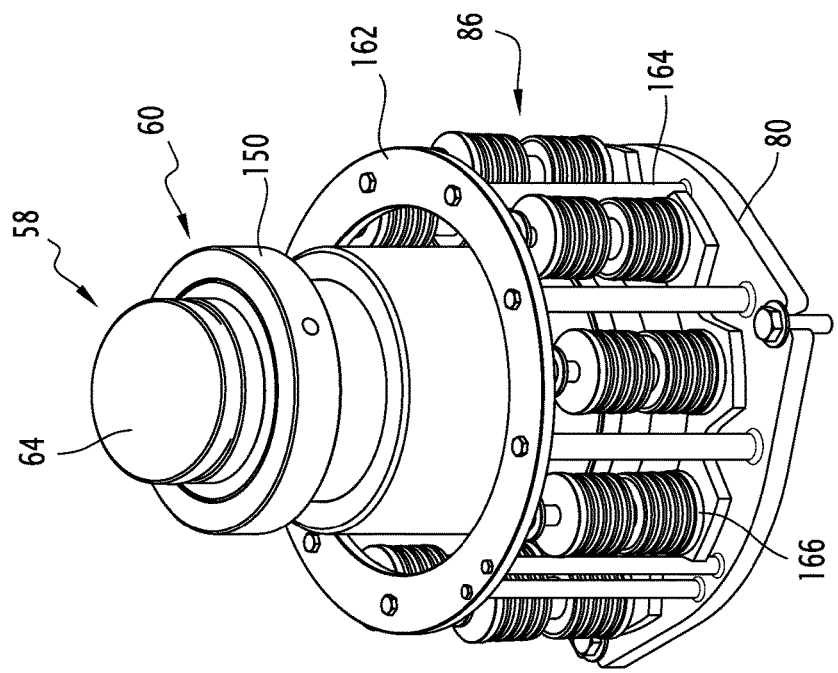
FIG. 22 is a view similar to FIG. 12 of the shock absorber of FIG. 21.
Figure 21:
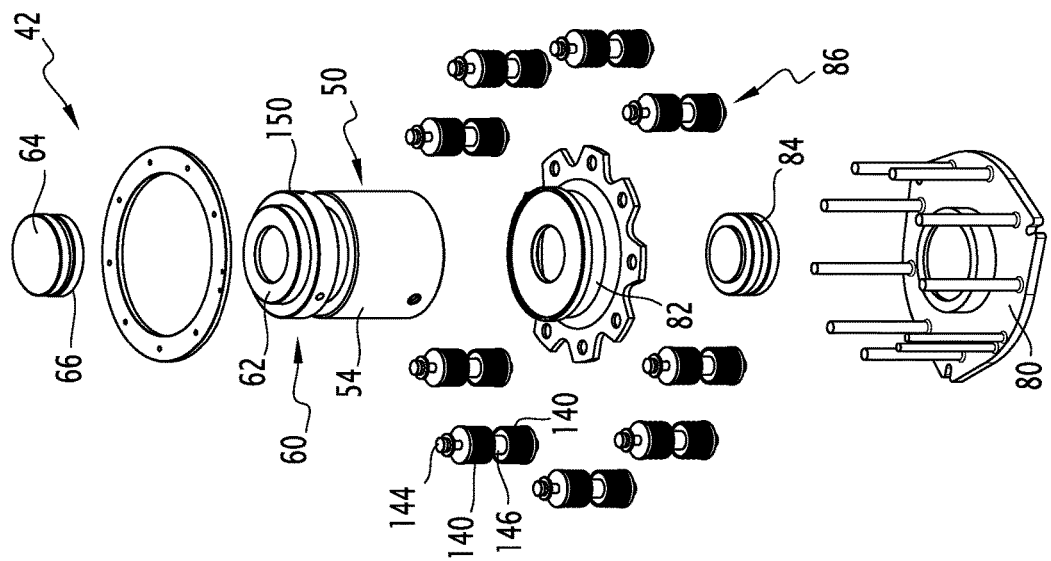
FIG. 21 is a view similar to FIG. 11 of a fourth example shock absorber for a shock-absorbing assembly according to the invention.

A fourth example shock absorber 42 according to the invention is described in FIGS. 21 and 22.

Unlike the second shock absorber 42 according to the invention, the mounting assembly 52 of the fourth shock absorber 42 comprises an upper stop crown 162 positioned around the jack 50. The crown 162 is connected to the base 80 by vertical bars 164.

The upper crown 162 is thus fixed in translation relative to the base 80. The jack support 82 is intercalated between the base 80 and the upper crown 162.

Like the second shock absorber 42 described in FIG. 11, each return member 86 of the fourth shock absorber 42 comprises at least one elastic biasing member 140 formed by a stack of washers mounted coaxially around a rod 146.

Figure 23:
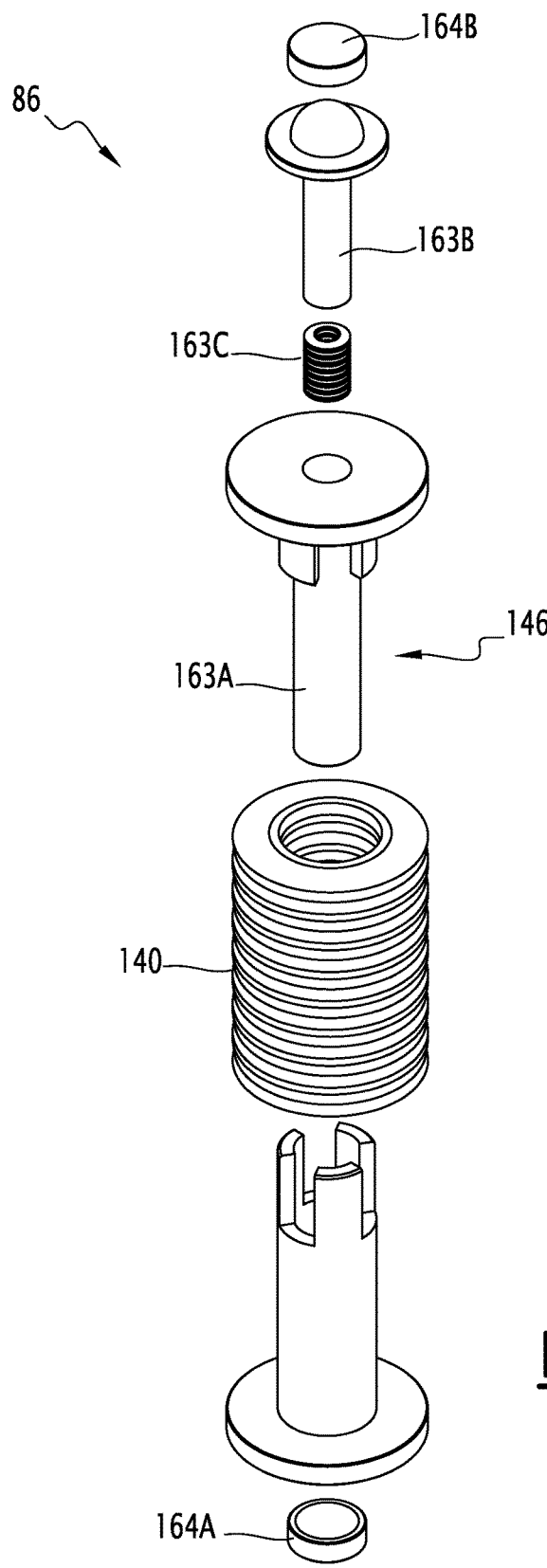
FIG. 23 is an exploded perspective view of a member biasing the shock absorber of FIG. 22.

As illustrated by FIG. 23, the rod 146 nevertheless has a first part 163A and a second part 163B sliding relative to the first part 163A, to allow an increase in its length. A second elastic biasing member 163C is interposed between the parts 163A, 163B of the rod 146.

Unlike the second shock absorber 42 described in FIG. 11, each return member 86 is wedged between the jack support 50 and the upper crown 162, around the cylinder 54.

When the jack support 50 locally approaches the upper crown 162, the return member 86 is compressed, and the elastic biasing member 140 exerts a return force.

On the contrary, when the jack support 50 moves locally away from the upper crown, the first part 163A of the rod 146 slides relative to the second part 163B of the rod 146, and the elastic biasing member 163C maintains the contact between each end 164A, 164B of the return member 86 and the jack support 50 of the upper crown 162, respectively.

In another alternative, each second shock absorber 42 described in FIGS. 11 to 18, 19 to 20 and 21 to 23 is associated with a guide member 70 fastened below the bearing surface 28 of the second element 16.

In one alternative, at least one group 40A to 40C of shock absorbers 42 is supported by the deck 26, which then constitutes a first element. Each shock absorber 42 protrudes toward the hull 18, which then constitutes a second element.

As defined above, it is advantageous for each shock absorber 42 of each group 40A to 40C of shock absorbers 42 of the shock-absorbing assembly 17 to be connected to a single shared fluid accumulator 44, and not to a plurality of accumulators 44.

In fact, the accumulator 44 is then dimensioned to receive the fluid coming from all of the shock absorbers 42 simultaneously, or on the contrary, from only some of the shock absorbers 42, for example when at least one other shock absorber is locked or inactive. The accumulator 44 is therefore suitable for all of the operating modes of the shock-absorbing assembly 17.

In the embodiment of FIGS. 1 and 2, it clearly appears that each pile 24 is associated with a shock-absorbing assembly 17 as defined above, fluidly independent from the other shock-absorbing assemblies 17 present on the other piles 24. The shock-absorbing assembly 17 is interposed between the receiving surface 20 of said pile 24 and the second element 16.

Thus, each shock-absorbing assembly 17 mounted on a pile 24 comprises a single accumulator 44 shared by all of the groups 40A to 40C of shock absorbers 42 present on the pile 24.

Each shock absorber 42 present on a pile 24 is fluidly connected to a single accumulator 44, shared by all of the shock absorbers 42 of the groups 40A to 40C of shock absorbers 42 present on the pile 24, without being fluidly connected to an accumulator 44 shared by the groups 40A to 40C of shock absorbers 42 of a shock-absorbing assembly 17 associated with another pile 24.

Furthermore, as indicated above, the accumulator 44 and the shock absorbers 42 of each shock-absorbing assembly 17 can be disassembled relative to the first element 14 and relative to the second element 16, once the definitive fastening elements between the first element 14 and the second element 16 are installed.

This makes it possible to reuse that shock-absorbing assembly 17 if necessary.

The invention claimed is:

1. A shock-absorbing assembly able to be interposed between a first element and a second element of an installation at least partially submerged in a body of water, comprising:
   at least one group of hydraulic shock absorbers, each shock absorber comprising a hydraulic jack comprising a cylinder intended to be supported by the first element, and a shock-absorbing member partially received in the cylinder, the shock-absorbing member having a head protruding outside the cylinder, the head being intended to come into contact with the second element during mounting of the second element on the first element;
   the shock-absorbing assembly comprising, for each group of shock absorbers, a fluid accumulator connected to each cylinder of the group of shock absorbers, to allow a hydraulic fluid transfer between the different cylinders of the group of shock absorbers during contact between each head and the second element;
   wherein the fluid accumulator comprises a hollow body delimiting an equilibration chamber and an equilibration piston mounted movably in the equilibration chamber, between a plurality of intermediate positions, wherein the equilibration piston is free to move relative to the hollow body in two opposite directions, and a downstream abutting position, in which the equilibration piston is immobilized in at least one direction relative to the hollow body; and
   in each of the intermediate positions of the equilibration piston, the equilibration piston tightly delimits, in the equilibration chamber, an upstream region configured to receive the hydraulic fluid coming from each hydraulic cylinder, and a downstream region configured to contain a volume of gas able to be expelled outside the equilibration chamber.

2. The assembly according to claim 1, comprising a valve emerging outside the equilibration chamber in a constant-pressure gas volume, the valve being configured to expel the volume of gas outside the equilibration chamber.

3. The assembly according to claim 1, wherein each shock-absorbing member comprises a shock-absorbing piston received in the cylinder, the head being pivotably mounted along at least one axis relative to the shock-absorbing piston.

4. The assembly according to claim 3, wherein the head is connected to the shock-absorbing piston by a ball joint connection.

5. The assembly according to claim 1, wherein each shock absorber comprises a base designed to be fastened on the first element, the cylinder of the hydraulic jack being mounted pivoting around at least one axis relative to the base, between a straight restrest configuration and a plurality of inclined configurations relative to the rest configuration.

6. The assembly according to claim 5, wherein each shock absorber comprises at least one return member for returning the cylinder to its rest configuration.

7. The assembly according to claim 5, wherein each shock absorber comprises a mechanical locking mechanism, able to mechanically immobilize the shock-absorbing member relative to the cylinder.

8. The assembly according to claim 5, comprising at least two groups of hydraulic shock absorbers, designed to be spaced apart from one another on the first element.

9. The assembly according to claim 8, wherein the hydraulic shock absorbers of each group are each connected to a same fluid accumulator.

10. The assembly according to claim 9, wherein the fluid accumulator is shared between all of hydraulic shock absorbers of all of the hydraulic shock-absorber groups.

11. An installation designed to be at least partially submerged in a body of water, characterized in that it comprises:
   the first element;
   the second element assembled on the first element;
   the shock-absorbing assembly according to claim 1, interposed between the first element and the second element, each cylinder of each shock absorber being supported by the first element, the head of at least some of the shock absorbers being in contact with the second element.

12. The installation according to claim 11, wherein the second element is placed on the first element.

13. The installation according to claim 11, wherein the first element is a support floating on a body of water or fastened on the bottom of the body of water, the second element being a deck placed above the surface of the body of water.

14. The installation according to claim 11, wherein the shock-absorbing assembly can be disassembled with respect to the first element and/or the second element.

15. A method for mounting an installation at least partially submerged in a body of water, comprising the following steps:
   providing the first element, and the shock-absorbing assembly according to claim 1, the cylinder of each shock absorber being supported by the first element, the head of each shock-absorbing member protruding outside the cylinder;

placing the second element in contact with the heads of several shock absorbers of the group of shock absorbers;

freely circulating hydraulic fluid between the cylinders of the group of shock absorbers and the accumulator.

16. The method according to claim 15, further comprising the free circulation of hydraulic fluid comprising a first phase in which the equilibration piston moves freely in the equilibration chamber under the effect of the hydraulic fluid coming from the cylinders of the group of shock absorbers, and a second phase in which the equilibration piston is immobilized in the equilibration chamber, and in which the hydraulic fluid present in the equilibration chamber and the cylinders is freely distributed between the equilibration chamber and the cylinders.

17. The method according to claim 15, wherein each shock-absorbing member comprises a shock-absorbing piston received in the cylinder, the head being pivotably mounted along at least one axis relative to the shock-absorbing piston, the method comprising, after placing the second element in contact on the head of at least one shock-absorbing member, pivoting of the head relative to the shock-absorbing piston.

18. The method according to claim 15, wherein each shock absorber comprises a base designed to be fastened on the first element, the cylinder of the hydraulic jack being mounted pivoting around at least one axis relative to the base, the method comprising, after placing the second element in contact on the head of at least one shock-absorbing member, pivoting of the cylinder relative to the base between a straight rest configuration and an inclined configuration relative to the rest configuration.

* * * * *